Aug. 18, 1953   W. P. MASON   2,649,027
ELECTROOPTICAL SYSTEM
Filed Feb. 18, 1947
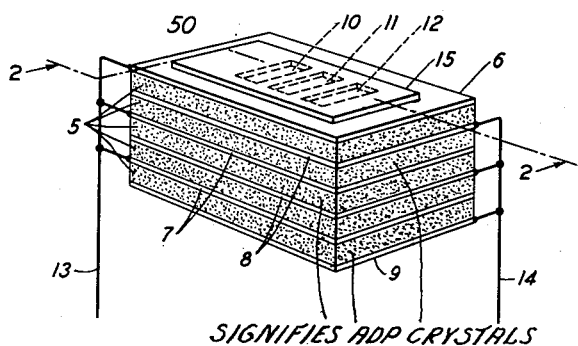
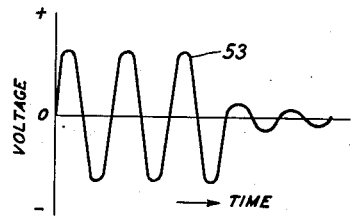
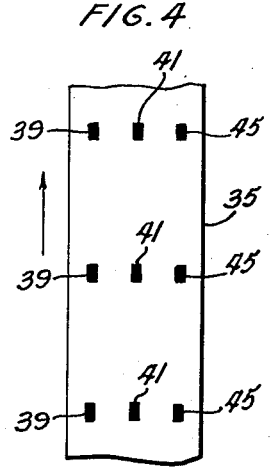
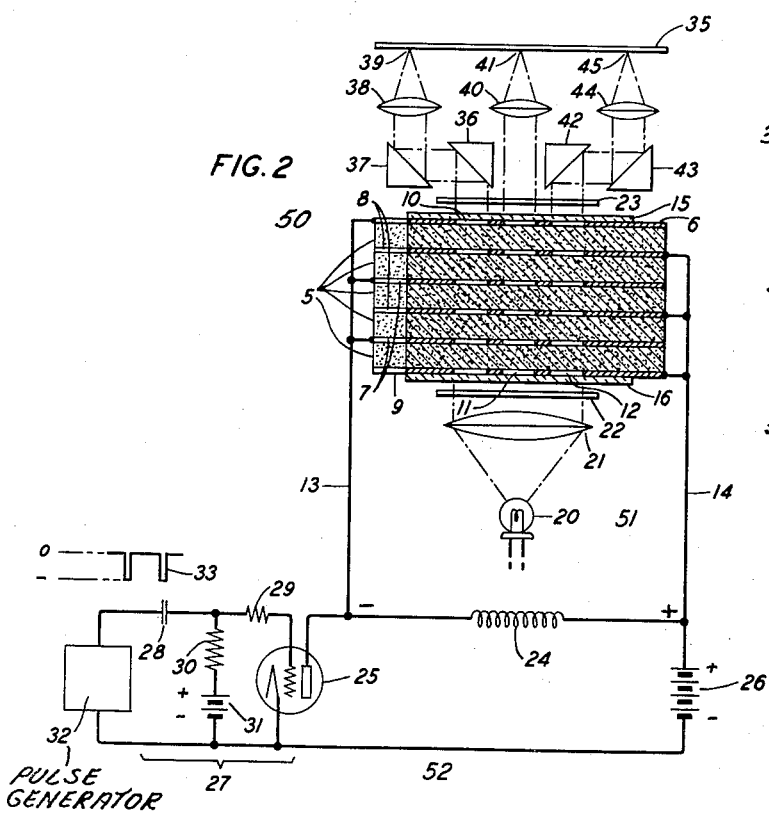
INVENTOR
W. P. MASON
BY
Stanley B. Kent
ATTORNEY Patented Aug. 18, 1953

2,649,027

UNITED STATES PATENT OFFICE 2,649,027

ELECTROOPTICAL SYSTEM

Warren P. Mason, West Orange, N. J., assignor to Bell Telephone Laboratories, Incorporated, New York, N. Y., a corporation of New York Application February 18, 1947, Serial No. 729,291

6 Claims. (Cl. 88—61)

This invention relates to an electro-optical system for producing pulses of light.

An object of the invention is to provide an improved light pulse producing system.

A more specific object is to utilize the capacitance of a well damped ADP crystal light valve as the capacitive element of an antiresonant circuit so that when the circuit is set into oscillation by control signals the crystal material of the light valve is stressed to produce light pulses.

The term ADP is used in this specification for the sake of brevity when referring to ammonium dihydrogen phosphate. The chemical symbol for ADP is $NH_4H_2PO_4$. For further information about ADP, reference is made to an article by W. P. Mason entitled "ADP and KDP Crystals" published in Bell Laboratories Record for July 1946, pages 257 to 260. W. P. Mason's application Serial No. 719,585, filed December 31, 1946, Patent 2,467,325, issued April 12, 1949, relates to light valves of the type disclosed in the present application.

The need for producing light pulses arises under a variety of circumstances. Light pulses of very short duration which can be produced in rapid and controlled succession are used in certain circumstances such as indicating time duration. A relatively simple system for producing such light pulses is therefore of great utility. The present invention provides such a system.

In an example of practice illustrative of this invention, a light valve comprising a plurality of ADP crystal plates is used as the light controlling element and the capacitive element of an antiresonant circuit, the current through the inductive element of the antiresonant circuit being rapidly reduced to set up oscillations in the circuit and so produce a pulse or pulses of light. The preferred form of ADP light valve comprises a plurality of Z-cut crystals having apertured electrodes on the respective major faces. The plurality of crystal plates are arranged in a pile with the apertures aligned for the passage of polarized light through the crystals in series or tandem in the direction of the Z axis. The plates are oriented so that the electrodes of like polarity of adjacent plates are adjacent. All of the electrodes of one polarity are connected together and to one terminal of the inductive element of the antiresonant circuit while all of the electrodes of the opposite polarity are connected together and to the other terminal of the inductive element. The inductive element is an air core coil. A high power triode is connected to pass current through the inductance coil of the antiresonant circuit when the control electrode is positively biased.

Electrical energy thus is stored in the coil. A negative control pulse is applied to the grid of the triode to block the tube and set the antiresonant circuit in oscillation. The voltage across the electrodes of the ADP light valve plates set up by such oscillations will make the crystal doubly refracting so that pulses of light will pass through the analyzer until the stored electrical energy is dissipated or until a positive bias is again applied to the grid of the triode. Controlled light pulses can thus be produced. A plurality of simultaneously produced light pulses may be obtained by a corresponding plurality of sets of aligned apertures in the electrodes of the ADP crystal plates.

The invention will now be described more in detail having reference to the accompanying drawing:

Fig. 1 is a perspective showing a pile of ADP crystal plates suitable for use in an embodiment of this invention;

Fig. 2 is a schematic showing of one embodiment of this invention;

Fig. 3 represents the wave form of the voltage impressed on the light valve for producing a light pulse in the arrangement of Fig. 2; and Fig. 4 illustrates a sample of record produced by the embodiment of Fig. 2.

The same reference characters are used to indicate identical elements in the several figures of the drawing.

Referring now to Fig. 1, five ADP crystal plates 5 are arranged in a pile 50 with the major faces substantially parallel. Each plate is a Z-cut slice from a normal ADP crystal, that is, a slice so cut that the major surfaces or faces are substantially perpendicular to the Z-axis of the crystal. Electrodes 6, 7, 8, and 9 are associated with the major faces of the crystal plates. These electrodes are provided with apertures 10, 11 and 12 which are similarly arranged in the several electrodes and aligned in the pile to form three sets of apertures. Electrodes 6 and 7 are of one polarity and electrodes 8 and 9 are of the opposite polarity determined by squeezing the crystal plates respectively between the electrodes. Electrodes which assume a positive potential when the respective crystal plates are squeezed are called positive electrodes while electrodes which assume a negative potential when the respective plates are squeezed are called negative electrodes. For the purposes of further description hereinafter, electrodes 6 and 7 will be called positive electrodes, and electrodes 8 and 9 will be called negative electrodes. The positive electrodes 6 and 7 are connected to conductor 13 and the negative electrodes 8 and 9 are connected to conductor 14. The electrodes are intimately joined to the respective major faces of the crystal plates as by glue. Cover glasses 15 and 16 are glued to electrodes 6 and 9, respectively, covering the apertures 10, 11 and 12. In a preferred arrangement the spaces between adjacent crystal plates formed by the apertures in the electrodes and between the cover glasses and the adjacent crystal plates formed by the apertures in electrodes 6 and 9 are filled with a material having the same index of refraction as the ADP crystal plates to obviate scattering of light at the apertures even though the major surfaces of the crystal plates at the apertures are not optically flat surfaces. Such filling may be omitted if such surfaces are substantially optically flat. Only five ADP crystal plates 5 are illustrated in the pile 50 of Fig. 1 but obviously any different larger or smaller number may be used as desired and circumstances dictate.

The pile of electro-optically birefringent piezo-electric crystal plates 50 illustrated in Fig. 1 is used in one embodiment of a light pulse producing system according to this invention as shown in Fig. 2. An optical arrangement comprising a concentrated source of light 20, a collimating lens 21 and a sheet of light polarizing material such as "Polaroid" sheet 22 are provided to direct three beams of polarized light through the crystal plates 5 in paths defined by the three sets of aligned apertures 10, 11 and 12. The collimating lens 21 gathers light from the source 20 and directs the gathered light through the "Polaroid" sheet 22 in a substantially parallel beam into the crystal plates 5 through the apertures 10, 11 and 12. An analyzer "Polaroid" sheet 23 is arranged over the apertures 10, 11 and 12 of electrode 6 and oriented with respect to the "Polaroid" sheet 22 so as to prevent the passage of light therethrough when the crystal plates are unstrained or slightly strained as described hereinafter. The resonant vibration of the crystal plates 5 is well damped by the glued joints and the frequency of vibration set well above the desired frequency for operation so that the electrical impedance of the pile 50 may be considered as a substantially pure capacitance. The terminal conductors 13 and 14 of the pile 50 are connected to the terminals of an inductor 24 to form an antiresonant circuit having low damping, the capacitance of the pile 50 and the inductance of the coil 24 being so chosen as to form an antiresonant circuit for the desired frequency of operation.

A control circuit for setting the antiresonant circuit into oscillation comprises a high power triode 25, a source of direct current voltage such as battery 26 and an input circuit 27. Input circuit 27 comprises a series condenser 28, a series grid resistor 29, a grid leak resistor 30, and a positive biasing source of direct current such as battery 31. The control voltage for initiating the light pulses may be provided by any suitable source 32 generating a voltage of wave form represented by the curve 33.

In normal operation the triode 25 is positively biased so that the cathode to anode impedance is relatively low and a relatively large substantially constant direct current flows through the coil 24 from battery 26. This corresponds to the zero amplitude portion of curve 33. During the negative portion of curve 33 the triode 25 is substantially blocked so that the circuit through battery 26 and triode 25 is practically open. The stored electrical energy in coil 24 is set into oscillation and controls the light energy by stressing the crystal plates 5 making the plates doubly refracting and causing one light component to lag behind the other. This causes a large proportion of the light to pass through the analyzer "Polaroid" sheet 23.

In the embodiment of the invention illustrated in Fig. 2 the light which passes through the analyzer sheet 23 is used to produce a photographic record on a sensitized film 35. The light from aperture 10 in electrode 6 after reflection by prisms 36 and 37 is converged by lens 38 to a small area 39 of film 35. The light from aperture 11 in electrode 6 is converged by lens 40 to a small area 41 of film 35 without reflection. The light from aperture 12 in electrode 6 after reflection by prisms 42 and 43 is converged by lens 44 to a small area 45 of film 35. If the film 35 is moved in known manner a record will be obtained of the light pulses produced by the crystal pile 50 under the control of control circuit 52 and antiresonant circuit 51, a pulse being recorded for each negative electrical impulse corresponding to curve 33.

The wave form of the voltage impressed on the birefringent piezoelectric crystal plates 5 when the antiresonant circuit 51 is oscillating is approximately like curve 53 of Fig. 3. The circuit starts to oscillate as soon as the negative biasing impulse from control voltage source 32 blocks the triode 25. Due to the low damping constant of the antiresonant circuit 51 the oscillations continue at substantially constant amplitude until the negative bias is removed when the control voltage returns to zero value and the oscillations rapidly are reduced to zero value. If the resistance of coil 24 is sufficiently small the voltage drop across coil 24 even at maximum direct current will be so small that the crystal plates 5 will be practically unstressed. Under these conditions the polarizing planes of polarizer 22 and analyzer 23 will be placed substantially at right angles to prevent transmission of light to the film 35. However, if coil 24 has appreciable resistance the crystal plates 5 will be sufficiently stressed by the direct current voltage drop in the coil to make the plates 5 doubly refracting so that light will be transmitted to the film 35 unless the analyzer "Polaroid" sheet 23 is rotated sufficiently to block the light. Therefore, the polarizer 22 and analyzer 23 should relatively be oriented so that no light is transmitted to the film 35 when the control voltage from source 32 is at zero value shown by curve 33 and the triode 25 is positively biased by battery 31 to cause maximum flow of current through coil 24 from battery 26.

A sample of a record produced by development of the emulsion of film 35 is shown by Fig. 4. As the film 35 is moved at uniform speed in the direction of the arrow past the small areas 39, 41 and 45, the emulsion is exposed over these areas each time the crystal pile 50 is set in oscillation producing light pulses. The movement of the film between pulses results in groups of exposed areas. The developed emulsion of the film shows groups of darkened areas 39, 41 and 45 corresponding to the areas which are exposed simultaneously and longitudinally arranged groups corresponding to successive exposures. The longitudinal separation of the groups is determined by the timing of the control pulses 33 and the speed of travel of the film 35.

In order to facilitate the practice of the invention certain design values will now be given. Obviously the invention may be embodied in specifically different forms so that the values given are not to be construed in a limiting sense.

In an illustrative specific embodiment the pile of birefringent piezoelectric crystal plates 50 consists of ten ammonium dihydrogen phosphate crystal plates 5 each 1.1 centimeters long by 1.0 centimeter wide and 0.1 centimeter thick. The total length of light path through the crystal is 1.0 centimeter. The electrodes are formed by plating the major surfaces of the crystal plates 5 with metal except for three square apertures approximately 0.2 centimeter on a side. It has been found that for blue light maximum light is transmitted through an analyzer of polarized light crossed at 90 degrees with a polarizer when a force of 26.3 pounds is applied in the direction of the Z axis between faces of an ADP crystal in the form of a cube 1.0 centimeter on a side which represents a force of $1.165 \times 10^7$ dynes per square centimeter between faces 1.0 centimeter apart. The same force may be produced by a voltage impressed between electrodes on the corresponding faces of the crystal according to the following equation:

$$X_{x'} = l_{36} \times V/300 \quad (1)$$

Since $l_{36}$ for the ADP crystal equals $9.05 \times 10^4$, the voltage gradient V necessary to produce a force per unit area, $X_{x'}$, of $1.165 \times 10^7$ dynes per square centimeter is 38,600 volts, arrived at as follows:

$$V = X_{x'} \times 300/l_{36} \quad (2)$$

or $$V = 1.165 \times 10^7 \times 300 \div 9.05 \times 10^4 = 38{,}600 \text{ volts} \quad (3)$$

The same voltage gradient may be produced across each of the ten ADP crystal plates 5 by a voltage of 3,860 volts applied as in Fig. 2 modified to use ten crystal plates 5 in the pile 50 instead of five as shown. By adjusting the positive bias on triode 25 until the total direct current resistance of the circuit including coil 24, battery 26 and triode 25 is about 825 ohms, the current flowing in the coil 24 is approximately 364 milliamperes for a battery voltage of 300 volts. The capacitance of the crystal pile 50 made up of the ten crystal plates 5 described above and measured between conductors 13 and 14 is about 150 micromicrofarads and the inductance of coil 24, about 16.9 millihenries. Therefore, the resonant frequency of the antiresonant circuit 51 is about 100,000 cycles per second according to the following equation:

$$f_R = \frac{1}{2\pi\sqrt{LC}} = \frac{1}{2\pi\sqrt{16.9 \times 10^{-3} \times 150 \times 10^{-12}}} \quad (4)$$

The energy stored in the inductance of coil 24 is ½ $Li^2$. When the antiresonant circuit 51 is set into oscillation by blocking triode 25, such energy is converted into electrostatic energy according to the following equations:

$$\tfrac{1}{2} Li^2 = \tfrac{1}{2} CE^2 \quad (5)$$

or $$E = \sqrt{\frac{L}{C}} \times i \quad (6)$$

or $$E = \sqrt{\frac{16.9 \times 10^{-3}}{150 \times 10^{-12}}} \times 0.364 = 3860 \text{ volts} \quad (7)$$

It is thus seen that the peak voltage of 3,860 volts generated in the antiresonant circuit 51 which is impressed across the electrodes of each of the ten crystal plates 5 of the crystal pile 50 is about sufficient to produce maximum light transmission through the analyzer sheet 23. The duration of the light pulse at a substantial value as shown in Fig. 3 is for 3 cycles of the oscillating voltage or 30 microseconds. The shortest light pulse at maximum amplitude obtainable with this specific arrangement is 5 microseconds.

From the foregoing description it is obvious that the invention may be embodied in a variety of forms other than those specifically described hereinbefore by way of example. Other kinds of crystal light valves may be used. Other kinds of electron discharge devices may be used in place of the triode 25 such as tetrode or pentode tubes. Such modified forms come within the purview of the appended claims.

What is claimed is:

1. An electro-optical system for converting electrical impulses into corresponding light pulses comprising a plurality of ammonium dihydrogen phosphate Z-cut crystal plates arranged in a pile, apertured electrodes of opposite polarity associated respectively with the major faces of said plates, the apertures in the several electrodes being aligned for the passage of light through said plates in the direction of the Z axis and all of the electrodes of the same polarity being connected together respectively, an inductance coil connected across the set of electrodes of opposite polarity forming an antiresonant circuit, means including light polarizing elements for producing pulses of light due to the stressing of said crystal plates when said antiresonant circuit is in a condition of oscillation, an electron discharge device having a cathode, an anode and a control electrode, a source of unidirectional current connected in series with said inductance coil and the cathode to anode discharge path of said discharge device, and means normally rendering said discharge device conductive but blocking said discharge device to set up oscillations in said antiresonant circuit when light pulses are desired.

2. An electro-optical system comprising a plurality of ammonium dihydrogen phosphate Z-cut crystal plates, apertured electrodes of opposite polarity secured respectively to the major faces of said plates, said plates with the associated electrodes being arranged in a pile with said major faces substantially parallel and the apertures aligned and said plates being cemented together with a cement having the same index of refraction as the ammonium dihydrogen phosphate crystal plates which highly damps the natural resonance of the plates, an inductance coil, a conductive element connecting the electrodes of one polarity to one terminal of said coil, and a second conductive element connecting the said electrodes of opposite polarity to the other terminal of said coil, the antiresonant circuit so formed having a resonant frequency well below the natural vibration frequency of the crystals of said pile of crystal plates.

3. An electro-optical system comprising a plurality of ammonium dihydrogen phosphate Z-cut crystal plates, apertured electrodes of opposite polarity secured respectively to the major faces of said plates, said plates with the associated electrodes being arranged in a pile with said major faces substantially parallel and the apertures aligned and said plates being cemented together with a cement having the same index of refraction as the ammonium dihydrogen phosphate crystal plates which cement highly damps the natural resonance of the plates, an inductance coil, a conductive element connecting all the electrodes of one polarity to one terminal of said coil, a second conductive element connecting all the said electrodes of opposite polarity to the other terminal of said coil, the antiresonant circuit so formed having a resonant frequency well below the natural vibration frequency of the crystals of said pile of crystal plates, an electron discharge device having a cathode, an anode and a control electrode, a source of unidirectional current connected in series with said inductance coil and the cathode to anode discharge path of said discharge device, and means normally rendering said discharge device conductive but blocking said discharge device to set up oscillations in said antiresonant circuit when light pulses are desired.

4. An electro-optical system for converting electrical impulses into corresponding light pulses, comprising a plurality of birefringent piezoelectric plates arranged in a pile, apertured electrodes of opposite polarity associated respectively with the major faces of said plates, the apertures in the several electrodes being aligned for the passage of light through said plates in the direction of birefringence and all of the electrodes of the same polarity being connected together respectively, an inductance coil connected across the set of electrodes of opposite polarity forming an antiresonant circuit, means including light polarizing elements for producing pulses of light due to the stressing of said plates when said antiresonant circuit is in a condition of oscillation, an electron discharge device having a cathode, an anode and a control electrode, a source of unidirectional current connected in series with said inductance coil and the cathode to anode discharge path of said discharge device, and means normally rendering said discharge device conductive but blocking said discharge device to set up oscillations in said antiresonant circuit when light pulses are desired.

5. An electro-optical system comprising a plurality of birefringent piezoelectric plates, apertured electrodes of opposite polarity secured respectively to the major faces of said plates, said plates with the associated electrodes being arranged in a pile with said major faces substantially parallel and the apertures aligned and said plates being cemented together with a cement having the same index of refraction as said plates which highly damps the natural resonance of the plates, an inductance coil, a conductive element connecting the electrodes of one polarity to one terminal of said coil, and a second conductive element connecting the said electrodes of opposite polarity to the other terminal of said coil, the antiresonant circuit so formed having a resonant frequency well below the natural vibration frequency of the crystals of said pile of piezoelectric plates.

6. An electro-optical system comprising a plurality of birefringent piezoelectric plates, apertured electrodes of opposite polarity secured respectively to the major faces of said plates, said plates with the associated electrodes being arranged in a pile with said major faces substantially parallel and the apertures aligned and said plates being cemented together with a cement having the same index of refraction as said plates which cement highly damps the natural resonance of the plates, an inductance coil, a conductive element connecting all the electrodes of one polarity to one terminal of said coil, a second conductive element connecting all the said electrodes of opposite polarity to the other terminal of said coil, the antiresonant circuit so formed having a resonant frequency well below the natural vibration frequency of said pile of piezoelectric plates, an electron discharge device having a cathode, an anode and a control electrode, a source of unidirectional current connected in series with said inductance coil and the cathode to anode discharge path of said discharge device, and means normally rendering said discharge device conductive but blocking said discharge device to set up oscillations in said antiresonant circuit when light pulses are desired.

WARREN P. MASON.

References Cited in the file of this patent

UNITED STATES PATENTS

| Number | Name | Date |
|---|---|---|
| Re. 18,274 | Hartley | Dec. 8, 1931 |
| 1,694,661 | Meissner | Dec. 11, 1928 |
| 1,792,752 | Michelsen | Feb. 17, 1931 |
| 1,939,532 | Zworykin | Dec. 12, 1933 |
| 1,997,371 | Loiseau | Apr. 9, 1935 |
| 2,064,289 | Cady | Dec. 15, 1936 |
| 2,179,098 | Mason | Nov. 7, 1939 |
| 2,304,901 | Eisler | Dec. 15, 1942 |
| 2,442,612 | Mynall | June 1, 1948 |

FOREIGN PATENTS

| Number | Country | Date |
|---|---|---|
| 32,939 | France | Dec. 29, 1927 |
| | (1st addition to No. 601,732) | |
| 382,939 | Great Britain | Nov. 3, 1932 |